US005490005A

United States Patent [19]
Jueliger

[11] Patent Number: 5,490,005
[45] Date of Patent: Feb. 6, 1996

[54] LIGHT SENSOR ON A SURFACE OF A LIGHT GUIDE FOR USE IN DISPLAYS

[75] Inventor: Peter Jueliger, Hagenbach, Germany

[73] Assignee: Robert Bosch GmbH, Stuttgart, Germany

[21] Appl. No.: 244,762

[22] PCT Filed: Nov. 19, 1992

[86] PCT No.: PCT/DE92/00963

§ 371 Date: Jun. 8, 1994

§ 102(e) Date: Jun. 8, 1994

[87] PCT Pub. No.: WO93/12515

PCT Pub. Date: Jun. 24, 1994

[30] Foreign Application Priority Data

Dec. 10, 1991 [DE] Germany ............. 41 40 647.8

[51] Int. Cl.$^6$ ............. G02F 1/137; G02F 1/135
[52] U.S. Cl. ............. 359/72; 359/84; 359/85; 359/49
[58] Field of Search ............. 359/72, 84, 85, 359/49

[56] References Cited

U.S. PATENT DOCUMENTS

| | | | |
|---|---|---|---|
| 4,560,239 | 12/1985 | Katz | 359/85 |
| 4,915,479 | 4/1990 | Clarke | 359/49 |
| 4,920,257 | 4/1990 | Fuerthbauer et al. | 359/84 |
| 5,153,756 | 10/1992 | Ike | 359/85 |

FOREIGN PATENT DOCUMENTS 3130937  2/1983  Germany .

OTHER PUBLICATIONS

Bayer Chemie, "FLAD Fluorescence–Activated Display, LISA–Plastics", *Praxisinformation*, Jul. 1982, pp. 1–6.

Primary Examiner—William L. Sikes
Assistant Examiner—Fetsum Abraham
Attorney, Agent, or Firm—Kenyon & Kenyon

[57] ABSTRACT

A light guide for a display device is disposed as a light-collecting film in front of or behind a display device and which detects the ambient light and the light from an illumination device incident on the display device. The illumination device is controlled by means of a light sensor disposed on a lateral surface of the light-collecting film. Because the light sensor is disposed on a lateral surface of the light-collecting film, the sensor does not disturb the beam path of the light incident on the display device. The sensor output is used to control the illumination device, which produces uniform illumination of the display device, so that its brightness matches the ambient brightness, while taking into account, by means of a correction factor, the number of display elements which are connected in an optically transparent manner.

10 Claims, 3 Drawing Sheets

LIGHT SENSOR ON A SURFACE OF A LIGHT GUIDE FOR USE IN DISPLAYS

FIELD OF INVENTION

The present invention relates to a light sensor for regulating the brightness of an illumination device for a display device.

BACKGROUND OF THE INVENTION

In known illumination devices, by way of example, a transflexive or transmissive liquid crystal display is surface-illuminated via a light guide to provide the illumination. In this case, a phototransistor is used to control the brightness of the display disposed in the light flux and regulates the illumination device as a function of the light flux. In European Published Patent Application No. 0 115 575 A3 a light guide is proposed which is constructed with two mutually opposite end faces and detects both the light incident through the windscreen of a motor vehicle and the light from the observation space in front of the dashboard. The total light which falls onto a milky white plastic body of the light guide is detected on laterally arranged sensors. With its relatively large dimensions, the light guide is arranged behind the windscreen in the region of the dashboard cover of a motor vehicle. Said light guide requires a relatively large amount of space, which is needed in this region for other electrical devices. Furthermore, the arrangement of the light guide behind the windscreen must be taken into consideration even when designing the passenger compartment, so that certain impediments to design freedom are imposed on the designer.

SUMMARY OF THE INVENTION

The light sensor according to the present invention, has, in contrast to the prior art, the advantage that the light sensor is constructed as a compact unit with the display device. An additional space in the region of the dashboard is not required, since the light guide has a light-collecting film, which is relatively thin and, as a result, hardly alters the construction of the display device. It is particularly advantageous that no readjustment is required, since the complete display device can be preassembled at the factory.

The use of a light-collecting film is particularly favorable for the reason that, on account of its structure, it deflects a part of the light onto the side surfaces, which are not illuminated by the incident light. If a sensor is now arranged at one of the side surfaces, then it receives the deflected lateral light, without its arrangement disturbing the transmitted light behavior of the collecting film. Such light-collecting foils are, in addition, economically available on the market. It is also advantageous that the light-collecting film performs the function of light filtering if the display is intended to appear in a specified color.

It is particularly advantageous that the light-collecting film is a plastic film, since it does not splinter in the event of an accident and, as a result, is not hazardous.

A very simple refinement of the arrangement in accordance with the present invention is in particular obtained by the use of a photoresistor, of a photodiode or of a phototransistor element, since such devices can directly convert the received light into a corresponding electrical signal.

If the light guide is, for example, arranged directly in front of an LCD display in the viewing direction, then the light falling onto the display device shines through it. In this case, the display brightness can be regulated to a desired value as an area integral over the entire area of the display device.

The light emerging into the sensor is advantageously intensified by mirror-coating the free lateral surfaces.

It is particularly advantageous that, as a result of the formation of a correction factor for the illumination regulation, the display device appears uniformly bright irrespective of the number of driven elements.

A further advantage can also be seen in that the brightness of the display can be predetermined by means of a setting element. As a result of this, the brightness of the display can individually be matched to the wishes of the driver.

In the case of an arrangement of the light guide behind the display device, but in front of an illumination device, on the other hand, the regulation of the brightness takes place essentially by the illumination device and by the transmissively connected elements of the display device. As a result of this, simple illumination-dependent brightness regulation is possible.

DETAILED DESCRIPTION

Figure 1:
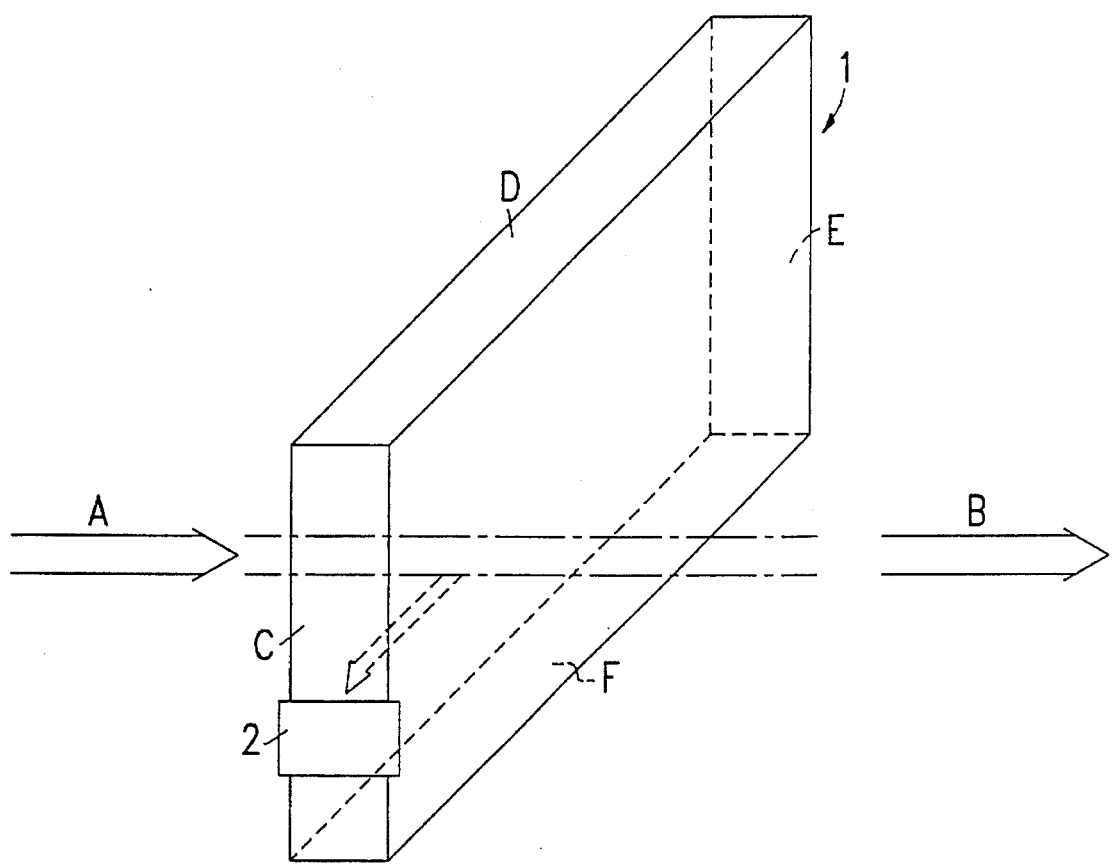
FIG. 1 shows a first embodiment of a light guide in accordance with the present invention.

FIG. 1 shows a first exemplary embodiment of a device in accordance with the present invention with a box-shaped light guide 1, which is illuminated on its front surfaces by a light flux A in a direction B. The lateral surfaces C, D, E, F of the light guide 1 are designed to be relatively narrow. By way of example, a sensor 2 is attached to the lateral surface C by adhesive bonding. The sensor 2 receives a part of the light flux A. The sensor 2 is arranged with its light-sensitive surface approximately parallel to the light flux A, so that the light flux A cannot fall directly onto it. The sensor 2 has electrical connecting leads, from which an electrical signal proportional to the light flux A can be picked off.

The light guide 1 has a transmissive filter plate, which is designed as a light-collecting film. It partially couples out the incident light and deflects the light onto the narrow sides C, D, E, F. In order that as much light as possible can fall onto the sensor 2, the free lateral surfaces C, D, E, F can be mirror-coated.

The light-collecting film, for example, is available under the name LISA in various thicknesses from the company Baier.

Figure 2:
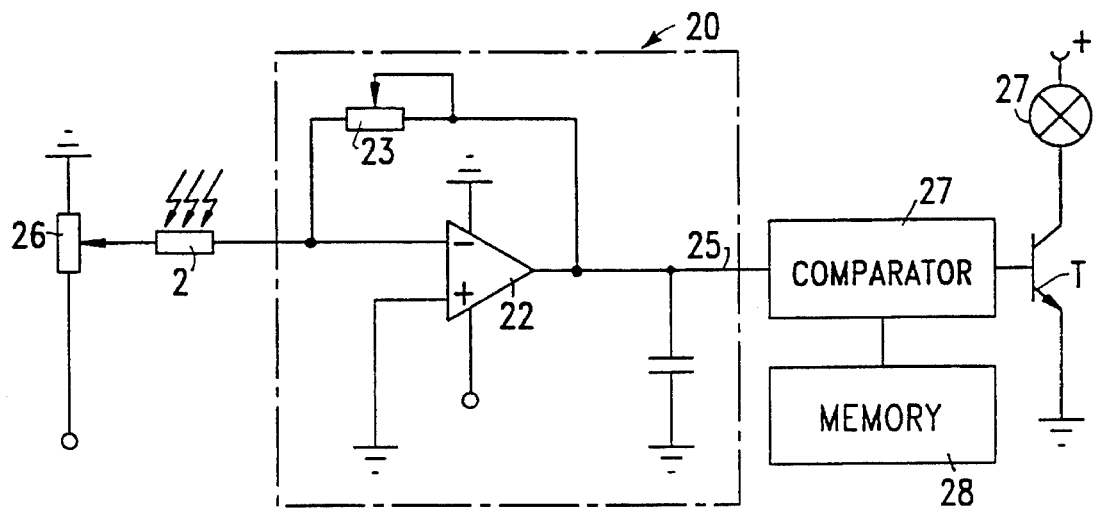
FIG. 2 is a schematic diagram of a circuit for regulating the brightness of a display device.

FIG. 2 shows an evaluating circuit 20, which evaluates the electrical signal from the sensor 2 to regulate the brightness of a display device (not shown). The evaluating circuit 20 essentially has an amplifier 22, which is operated with a normal supply voltage. Between the output 25 and an input of the amplifier 22 there is connected an adjustable resistor 23 for matching to the upstream sensor 2. Furthermore, the sensor 2 is connected to this input on the one hand and by its free connection on the other hand to the center tap of a voltage divider 26. The sensitivity of the sensor 2 is adjustable via the voltage divider 26, which at the same time delivers the supply voltage for the sensor 2. The output 25 of the amplifier 22 is connected via a comparator 27 to the control input of a transistor T, in the collector circuit of which a lamp 21 is connected to the supply voltage. A memory 28, in which characteristic data of the lamp 21 are stored, is connected to the comparator 27.

Figure 3:
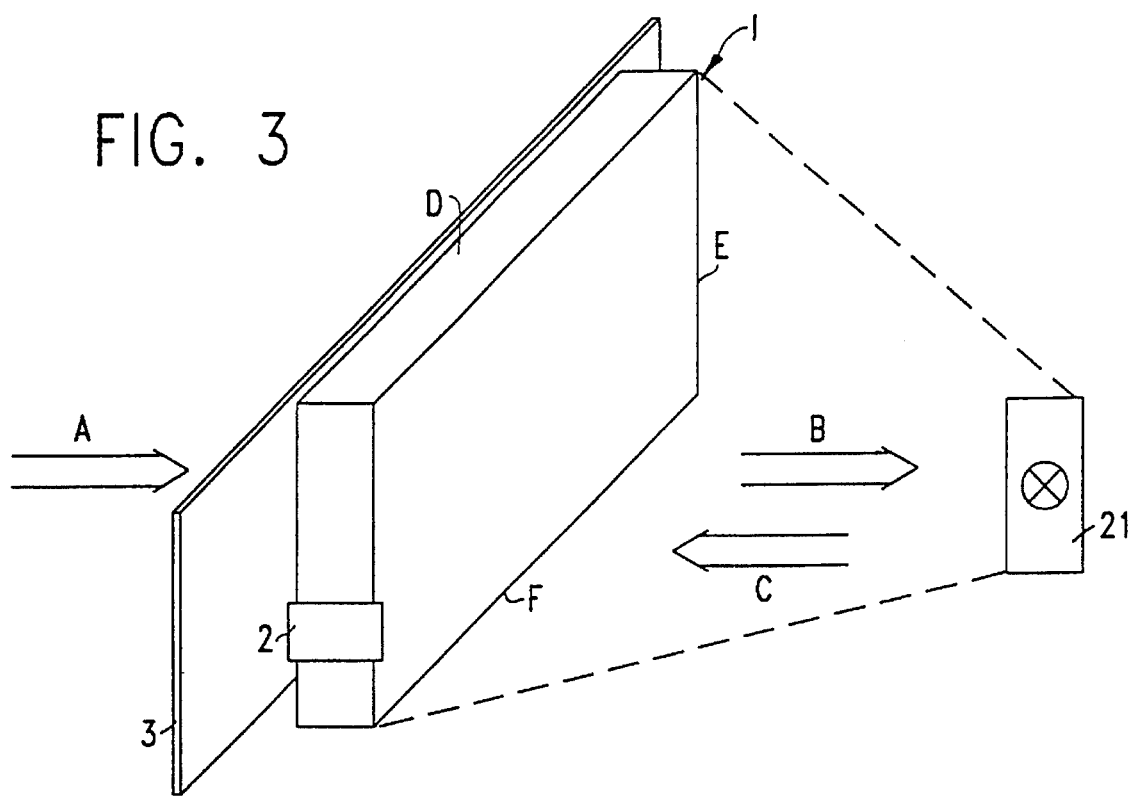
FIG. 3 shows the light guide of FIG. 1 arranged behind a transmissive LCD display.
Figure 4:
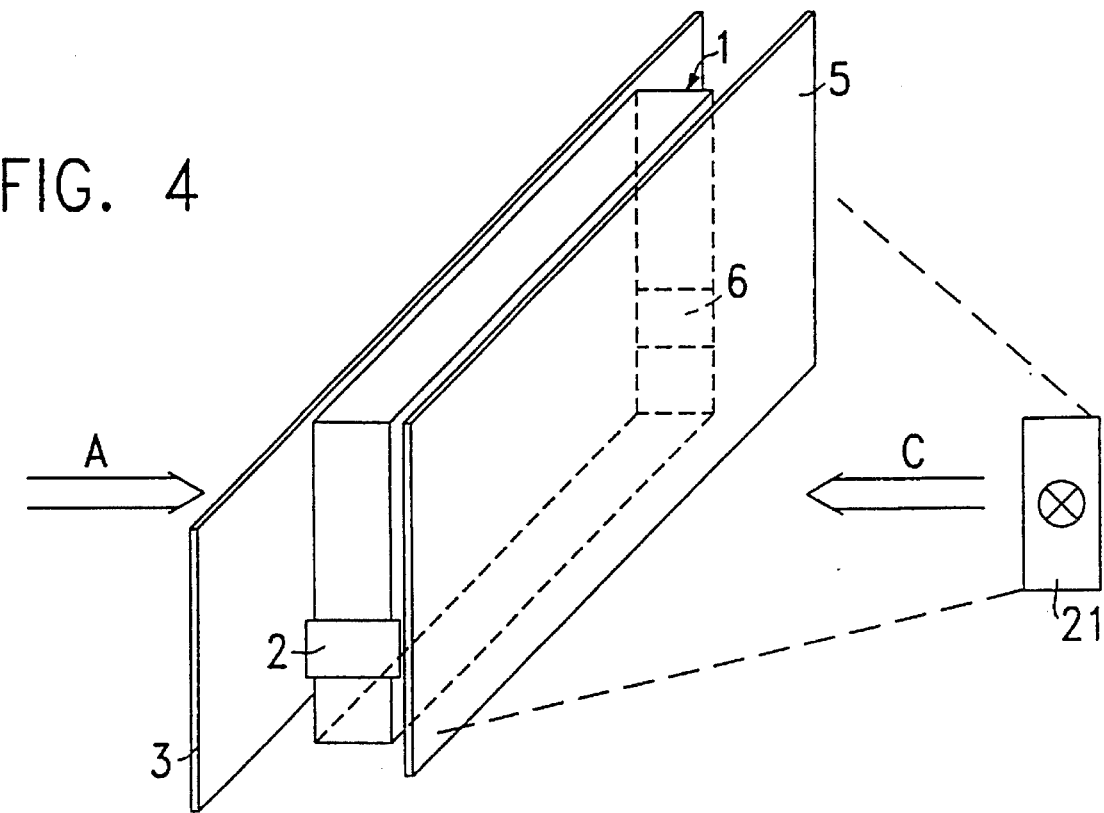
FIG. 4 shows the arrangement of FIG. 3 including a transflector.
Figure 5:
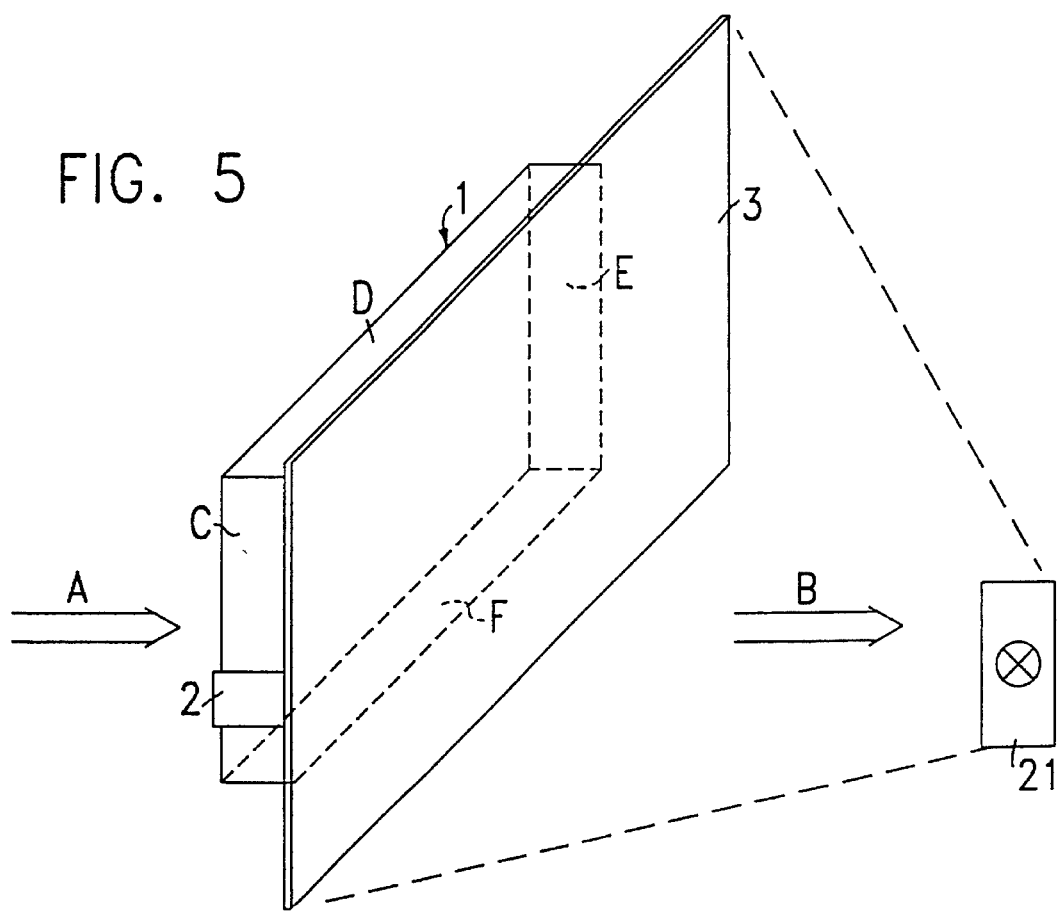
FIG. 5 shows the light guide of FIG. 1 arranged in front of an LCD display.

FIGS. 3 to 5 show further exemplary embodiments of the arrangement of the light guide 1 on a display device 3. In FIG. 3, the light guide 1 described in FIG. 1 is arranged between a transmissive liquid crystal display (LCD display) and the illumination device 21. As seen by an observer, the light guide 1 is arranged behind the LCD display 3 and is therefore not visible. As can be inferred from FIG. 3, the ambient light A falls through the transmissive LCD display 3 directly onto the light guide 1.

The mode of operation of this arrangement is described as follows. According to FIG. 3, there falls onto the light guide 1 both the ambient light (light flux A) and the light flux C of the illumination device 21. Both light fluxes are partially deflected in the light guide 1 onto the lateral surfaces C–F and are indirectly picked up by the sensor 2, which emits a corresponding voltage signal at the output U of the evaluating circuit 20. In order to obtain the best possible illumination of the display device with adequate contrast in relation to the ambient light, the illumination device 21 must be controlled in such a manner that its disturbing influence on the light guide 1 is eliminated. Most simply, this can be performed by means of a calibration measurement. To this end, the front side of the light guide 1 is covered over, so that only the light of the illumination device 21 can fall onto the light guide 1. Under these conditions, now, by variation of the illumination intensity of the illumination device 21, i.e., by alteration of the lamp current, the corresponding voltage of the sensor 2 can be picked off and, for example, stored as a characteristic for the illumination device 21. If the front side of the light guide 1 is now exposed again, so that the ambient light also falls onto the light guide 1, then the sensor 2 measures a correspondingly greater voltage. By subtraction of the corresponding light flux of the characteristic stored in the memory 28, the influence of the illumination device 21 can be eliminated in the comparator 27, so that a value is obtained for the ambient light of the light flux A. The associated value of the characteristic can be measured, for example, by measuring the flux through the illumination device 21 and these values can be stored. Using this determined value of the light flux A of the ambient light, it is now possible to drive the illumination device 21 as desired. Via the voltage divider 26, it is further possible to perform individual, fine graduation of the contrast for the display device 3.

In place of the illumination device 21, which can be used in particular in conjunction with an illuminatable liquid crystal display, the sensor signal can also be used for regulation of the brightness of other displays, such as electroluminescence displays or the like.

In a further exemplary embodiment according to FIG. 4, the design proposed in FIG. 3 is expanded by an additional transflector 5, which is arranged between the light guide 1 and the illumination device 21. The transflector has the function of reflecting the light flux A, so that the ambient light is used essentially for illumination of the LCD display 3. The illumination device 21 serves as auxiliary illumination, the light of which passes unobstructed through the transflector and additionally illuminates the LCD display 3. The brightness of the auxiliary illumination is controlled in the same manner, as described above.

In a further refinement of the present invention, according to FIG. 4, a further sensor 6 is arranged on a narrow side E of the light guide 1. In this exemplary embodiment, the further sensor 6 can be used for the calibration measurement of the illumination device 21.

To determine the magnitude of the influence of the illumination device 21, it is further provided to increase the intensity of illumination of the illumination device 21 stepwise and in this case to compare the voltage change U at the output of the evaluating circuit 20. On the basis of the iterative change of the voltage U, the influence of the illumination device 21 at constant ambient brightness can be picked up directly.

In an exemplary embodiment according to FIG. 5, the arrangement of the light guide is in front of a transmissive LCD display 3. The LCD display 3 is illuminated by the illumination device 21 arranged behind it. The illumination regulation takes place in a manner similar to that described in FIG. 3.

Figure 6:
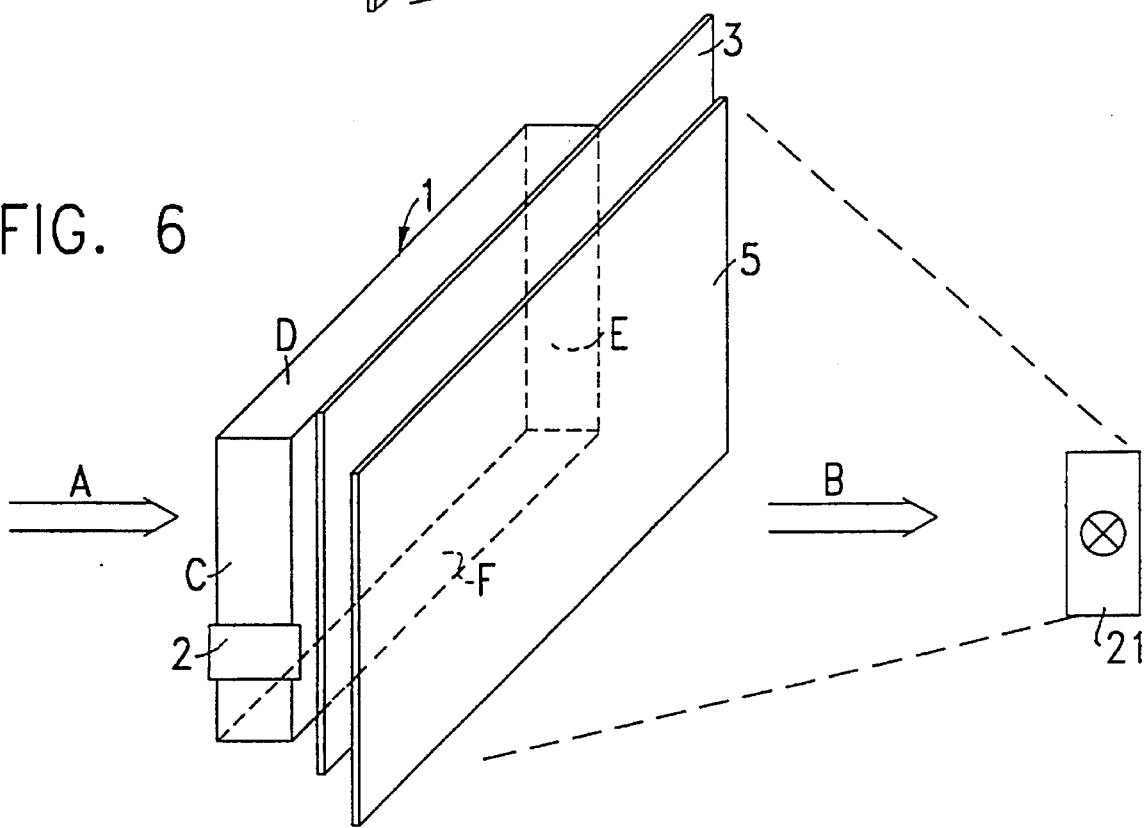
FIG. 6 shows the arrangement of FIG. 5 including a transflector.

FIG. 6 shows an exemplary embodiment of a transflexive LCD display device 3, in which the light guide 1 is likewise arranged in front of the LCD display 3. The mode of operation is likewise comparable with the exemplary embodiment shown in FIG. 4. However, only one sensor 2 was used.

In the exemplary embodiments shown in FIGS. 3, 4, 5, 6, with the arrangement of the filter plate behind and in front of the LCD display, it is possible for errors to occur in determining the influence of the ambient light and of the light of the illumination device 21, if only some of the indicated elements of the display device 3 are connected in an optically transparent manner. For, if few elements are connected in an optically transparent manner in the case of FIGS. 3 and 4, then the influence of the ambient light which is picked up by the light guide 1 is correspondingly small, so that the rear illumination must be intensified. If all the elements of the display device 3 are connected in an optically transparent manner, then the maximum influence of the ambient light 21 is picked up, so that the rear illumination must be relatively reduced.

In the case of the arrangement according to FIGS. 5 and 6, the influence of the illumination device 21 has to be considered as a function of the number of elements connected in an optically transparent manner.

In the case of a display device 3 which is only partially optically transparent, there accordingly arises an error which is dependent on the number of elements which are connected in an optically transparent manner. This error is, however, easily correctable. Since, on account of the drive of the display device 3, the respective number of driven and optically transparent elements is known, it is possible to form a factor by formation of the ratio to the maximum number of the display elements, which factor can additionally be used as a correction factor for the control of the illumination device 21. In the exemplary embodiments in FIGS. 5 and 6, with few elements to be displayed, the correction factor producing, for example, attenuation of the rear illumination, while with many elements to be displayed it produces an intensification. This results in a uniformly bright and uniformly contrast-rich display appearing in an advantageous manner as the image in all cases, irrespective of the number of display elements to be displayed on the display device 3, the brightness of which display alters only with the influence of the ambient brightness. For, in bright daylight, the display must be illuminated correspondingly brightly, while, for example, when travelling, through a tunnel it is correspondingly reduced, so that it does not blind the driver.

What is claimed is:

1. A display device comprising:

a light guide sheet for detecting an ambient light in front of the display device, the light guide having a plurality of side surfaces and a light-collecting film which projects at least part of a light incident to the light guide onto at least one of the side surfaces;

a sensor disposed on the light guide, the sensor detecting light emerging from at least one of the side surfaces and emitting a signal as a function of the light detected;

an illumination device for illuminating the display device; and a controller for controlling an illumination intensity of the illumination device in accordance with the signal emitted by the sensor.

2. The display device according to claim 1, wherein the light-collecting film is a plastic film.

3. The display device according to claim 1, wherein the sensor is disposed on at least one of the side surfaces.

4. The display device according to claim 3, wherein the sensor includes an element selected from the group consisting of a photoresistor, a photodiode, and a phototransistor.

5. The display device according to claim 1, wherein the display device includes a liquid crystal display (LCD).

6. The display device according claim 1, wherein the illumination intensity of the illumination device can be adjusted manually by means of an adjustable element.

7. The display device according to claim 1, wherein the side surfaces from which light does not emerge are at least partially mirror-coated.

8. The display device according to claim 1, further comprising a measuring device for counting a number of elements of the display device which are connected in an optically transparent manner, and wherein the controller controls the illumination device in such a manner that the illumination intensity of the illumination device is correspondingly decreased in the case of a small number of optically transparent display elements, and correspondingly increased in the case of a large number of optically transparent elements.

9. The display device according to claim 1, wherein the light guide is arranged in front of the display device.

10. The display device according to claim 1, wherein the light guide is arranged behind the display device.

* * * * *